United States Patent [19]

Kitawaki

[11] Patent Number: 5,386,300
[45] Date of Patent: Jan. 31, 1995

[54] PICTURE PROCESSING SYSTEM FOR A NATURAL PICTURE IN A FACSIMILE DEVICE

[75] Inventor: Sachiko Kitawaki, Tokyo, Japan

[73] Assignee: NEC Corporation, Japan

[21] Appl. No.: 158,698

[22] Filed: Nov. 29, 1993

[30] Foreign Application Priority Data

Nov. 27, 1992 [JP] Japan .................................. 4-318071

[51] Int. Cl.$^6$ ............................................. H04N 1/41
[52] U.S. Cl. ..................................... 358/426; 358/539
[58] Field of Search ............... 358/426, 438, 434, 427,
358/430, 432, 261.1, 261.2, 261.3, 445, 448, 463,
518, 520, 530, 532, 539; 348/397, 398, 390, 391,
393–396, 403–405, 607, 608

[56] References Cited

FOREIGN PATENT DOCUMENTS 2855395 7/1979 Germany ............................ 358/133

Primary Examiner—Scott A. Rogers
Attorney, Agent, or Firm—Ostrolenk, Faber, Gerb & Soffen

[57] ABSTRACT

In a picture processing system for processing an input picture data signal representative of an original picture, such as a color natural picture, into a processed picture data signal, a detecting unit produces a difference picture data signal representative of a difference between the input picture data signal and an expanded picture data signal. The expended picture data signal is produced by a picture data expanding unit which expands a compressed picture data signal. The compressed picture data signal is produced by a first compressing section which compresses the input picture data signal. A converting unit converts the difference picture data signal into a binary picture data signal. A second compressing section compresses the binary picture data signal into a compressed binary picture data signal which is for use as the processed picture data signal. Preferably, the system further has a transmitting unit for transmitting the compressed binary picture data signal to an external device as a facsimile data signal, a binary picture data expanding unit for expanding the compressed binary picture data signal into an expanded binary picture data signal, and an output unit for outputting the expanded binary picture data signal as an output picture image. The expanded binary picture data signal may be transmitted as the facsimile data signal instead of the compressed binary picture data signal.

7 Claims, 4 Drawing Sheets

PICTURE PROCESSING SYSTEM FOR A NATURAL PICTURE IN A FACSIMILE DEVICE

BACKGROUND OF THE INVENTION

This invention relates to a picture processing system for use in a facsimile device in processing an input picture data signal representative of an original picture, such as a natural picture, into a processed picture data signal and, more particularly, to the picture processing system for processing a color natural picture into a binary picture data signal which is for use as the processed picture data signal.

On transmitting a color natural picture representative of a natural sight image, a person image, or the like as an original picture in a facsimile device, the color natural picture is generally inputted into the facsimile device as an input picture data signal as it is. Alternatively, coped picture given by copying the color natural picture, is inputted into the facsimile device as the input picture data signal. The input picture data signal is transmitted by the facsimile device with the input picture data signal converted into a binary picture data signal as a facsimile data signal.

As a further alternative, the input picture data signal is compressed into a compressed picture data signal by a compressing unit included in the facsimile device. The facsimile device further comprises an expanding unit which expands the compressed picture data signal into an expanded picture data signal which approximate to the input picture data signal. That is, the expanded picture data signal represents an approximate picture which approximates to the original picture. A converting unit converts the expanded pictures data signal into a binary picture data signal. A transmitting unit transmits the binary picture data signal as the facsimile data signal to a counterpart facsimile device which has similar functions.

In any one of the above-mentioned facsimile transmission methods, the natural picture can not be reproduced with a high quality by the counterpart facsimile device. This is because any one of the original picture, the coped picture of the original picture, and the approximate picture of the original picture is compelled to be converted into the binary picture data signal.

When any one of the original picture, the copied picture, and the approximate picture is converted into the binary picture data signal and when the binary picture data signal is transmitted as the facsimile data signal, the facsimile data signal inevitably represents an unnatural picture in which stereoscopical feeling or sense disappears. The counterpart facsimile device can not reproduce the original picture with ah high quality from the facsimile data signal in view of fine gradation of a natural color, hue, brightness, and saturation.

SUMMARY OF THE INVENTION

It is therefore an object of this invention to provide a picture processing system for use in a facsimile device, which system makes it possible to reproduce a picture with a high quality in a counterpart or external device.

Other objects of this invention, there is provided a picture processing system for processing an input picture data signal representative of an original picture into a processed picture data signal. The system comprises first compressing means supplied with the input picture data signal for compressing the input picture data signal into a compressed picture data signal, a picture data expanding unit connected to the first compressing means for expanding the compressed picture data signal into an expanded picture data signal, a detecting unit supplied with the input picture data signal and connected to the picture data expanding unit for detecting a difference between the input picture data signal and the expanded picture data signal to produce a difference picture data signal representative of the difference, a converting unit connected to the detecting unit for converting the difference picture data signal into a binary picture data signal, and second compressing means connected to the converting unit for compressing the binary picture data signal into a compressed binary picture data signal which is for use as the processed picture data signal.

DESCRIPTION OF THE PREFERRED EMBODIMENT

Figure 1:
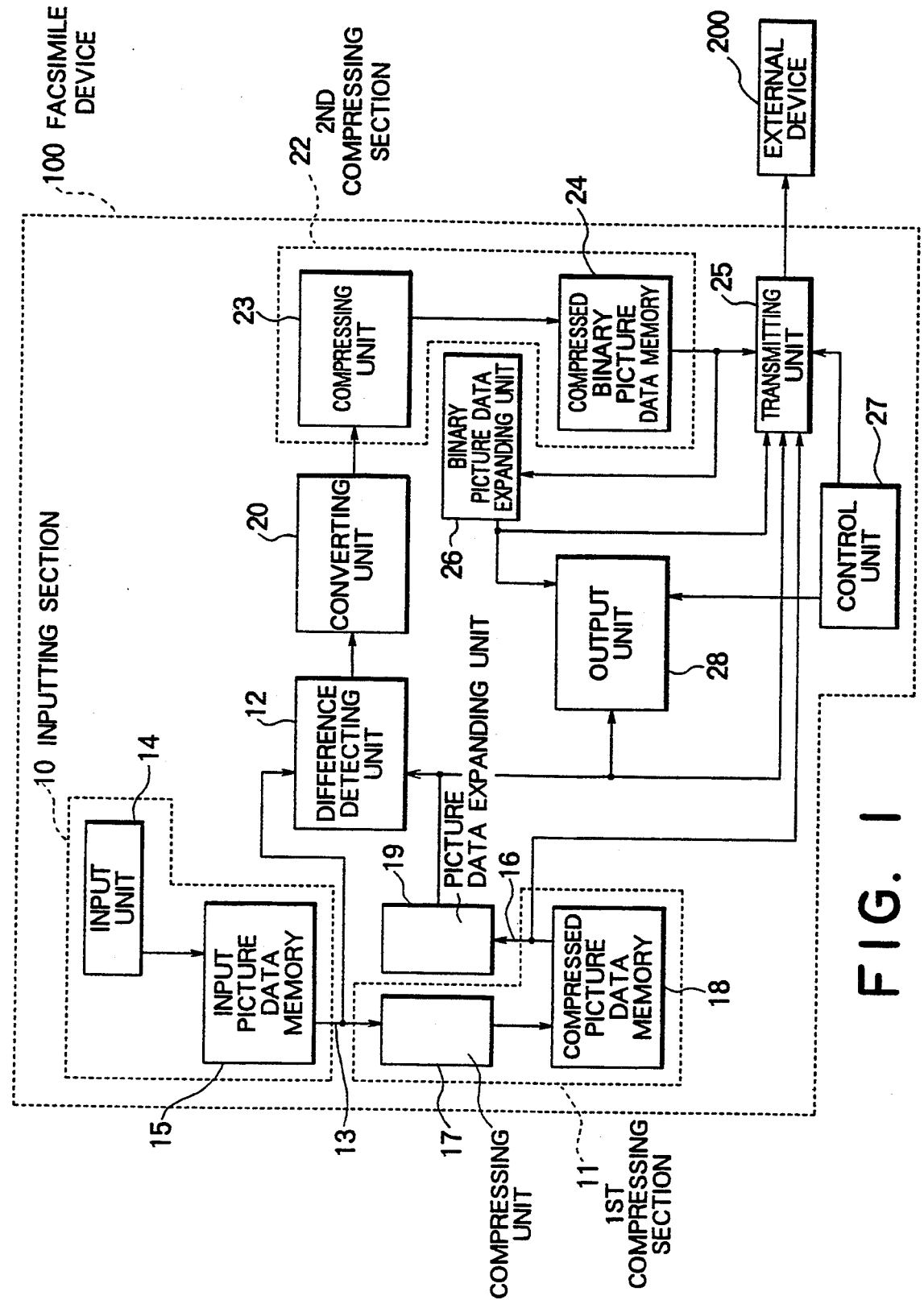
FIG. 1 is a block diagram of a facsimile device including a picture processing system according to an embodiment of this invention.

Referring to FIG. 1, a picture processing system according to a preferred embodiment of this invention is for use in a facsimile device 100 in processing an original picture into a processed picture data signal. The original picture has a natural color and is typically a color natural picture representative of a natural sight image, a person image, or the like.

The picture processing system comprises an inputting section 10, a first compressing section 11, and a difference detecting unit 12. The inputting section 10 inputs the original picture as an input picture data signal 13 representative of the original picture into the first compressing section 11 and the difference detecting unit 12.

More specifically, the inputting section 10 comprises an input unit 14 and an input picture data memory 15 connected to the input unit 14. The input unit 14 inputs the original picture as input picture data into the input picture data memory 15. The input picture data memory 15 memorizes the input picture data as the input picture data signal 13.

Supplied with the input picture data signal 13 representative of the original picture, the first compressing section 11 compresses the input picture data signal 13 into a compressed picture data signal 16.

More specifically, the first compressing section 11 comprises a compressing unit 17 and a compressed picture data memory 18. The compressing unit 17 compresses the input picture data signal 13 into compressed picture data. In this event, the compressing unit 17 carries out JPEG (Joint Photographic Experts Group) compression when the original picture is a still or static picture. When the original picture is a motion picture, the compressing unit 17 carries out M-JPEC (Motion Joint Photographic Experts Group) compression and/or MPEG (Motion Photographic Experts Group) compression. Connected to the compressing unit 17, the compressed picture data memory 18 memories the compressed picture data as the compressed picture data signal 16.

A picture data expanding unit 19 is connected to the compressed picture data memory 18 of the first compressing section 11. The picture data expanding unit 19 expands the compressed picture data signal 16 into an expanded picture data signal which approximates to the input picture data signal 13. That is, the expanded picture data signal represents an approximate picture which approximates to the original picture (namely, the natural picture).

The difference detecting unit 12 is supplied with the input picture data signal 13 and connected to the picture data expanding unit 19. The difference detecting unit 12 detects a difference between the input picture data signal 13 and the expanded picture data signal and produces a difference picture data signal representative of the difference.

A converting unit 20 is connected to the difference detecting unit 12. The converting unit 20 converts the difference picture data signal into a binary picture data signal (that is, a two valued picture data signal). In other words, the converting unit 20 converts the difference picture data signal representative of color data into the binary picture data signal. representative of monochrome data.

A second compressing section 22 is connected to the converting unit 20. The second compressing section 22 compresses the binary picture data signal into a compressed binary picture data signal which is for use as the processed picture data signal.

More specifically, the second compressing section 22 comprises a compressing unit 23 and a compressed binary picture data memory 24. The compressing unit 23 compresses the binary picture data signal into compressed binary picture data. That is, the compressing unit 23 is supplied with the monochrome data of the binary picture data signal as characteristic line segment data and compresses the characteristic line segment data into the compressed binary picture data by the use of MH (Modified Huffman) compression, MR (Modified Relative Element Address Designate) compression, and/or MMR (Modified MR) compression. Connected to the compressing unit 23, the compressed binary picture data memory 24 memorizes the compressed binary picture data as the compressed binary picture data signal.

A transmitting unit 25 is connected to the compressed binary picture data memory 24 of the second compressing section 22. The transmitting unit 25 transmits the compressed binary picture data signal as a facsimile data signal to an external device 200 which is typically a counterpart facsimile device.

In practice, the transmitting unit 25 is further connected to a binary picture data expanding unit 26. Connected to the compressed binary picture data memory 24 of the second compressing section 22, the binary picture data expanding unit 26 expands the compressed binary picture data signal into an expanded binary picture data signal which approximates to the binary picture data signal produced by the converting unit 20.

The transmitting unit 25 selectively transmits, as the facsimile data signal, a selected one of the compressed binary picture data signal and the expanded binary picture data signal to the external device 200 under control of a control unit 27. When the external device 200 has an expanding function which is similar to the binary picture data expanding unit 26, the control unit 27 controls the transmitting unit 25 to transmit the compressed binary picture data signal to the external device 200 in the manner which will later be described. When the external device 200 does not have the expanding function, the control unit 27 controls the transmitting unit 25 to transmit the expanded binary picture data signal to the external device 200 in the manner which will also later be described.

The transmitting unit 25 is still further connected to the picture data expanding unit 19 so as to transmit the expanded picture data signal to the external device 200 as the facsimile data signal under control, of the control unit 27 in the manner which will become clear as the description proceeds.

An output unit 28 is, for example, a display unit or the like and is connected to the binary picture data expanding unit 26. The output unit 28 outputs the expanded binary picture data signal as an output picture image. In practice, the output unit 28 is further connected to the picture data expanding unit 19 to selectively output a selected one of the expanded binary picture data signal and the expanded picture data signal as the output picture image under control of the control unit 27 in the manner which will become clear as the description proceeds.

Figure 2:
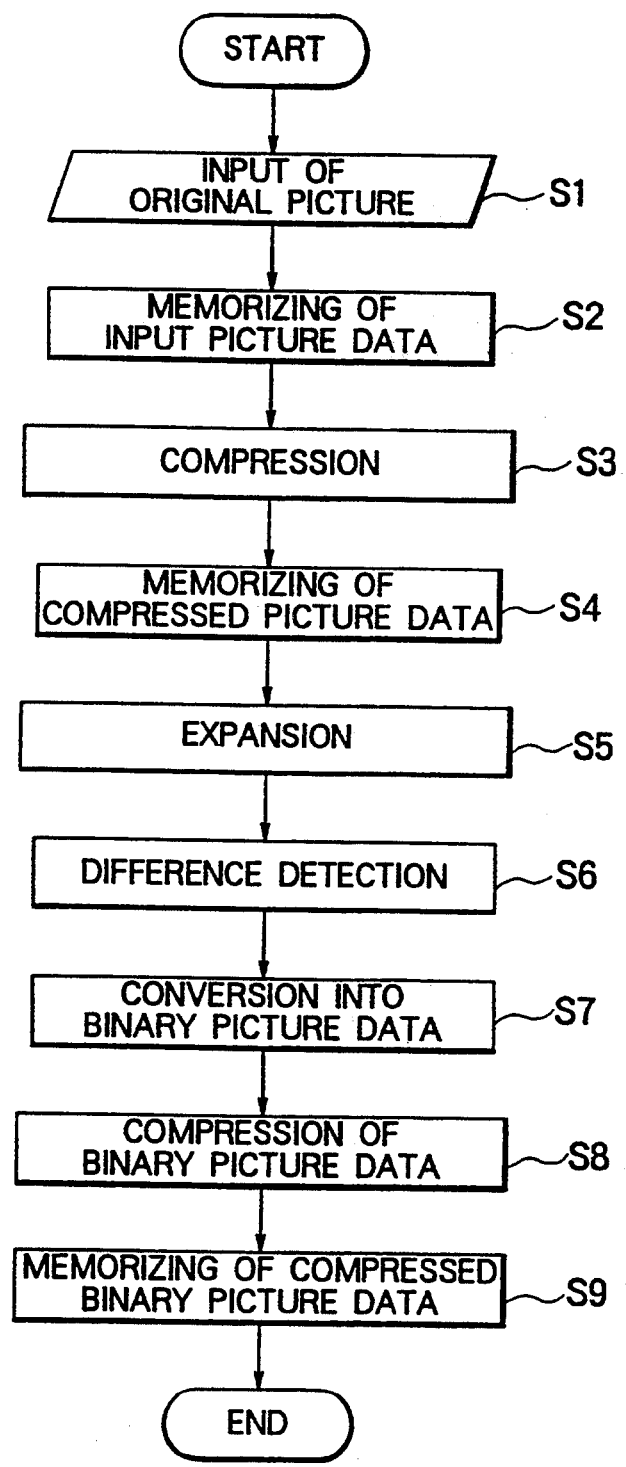
FIG. 2 is a flow chart for use in describing picture processing operation of the picture processing system of the facsimile device illustrated in FIG. 1.

Turing to FIG. 2 with reference to FIG. 1 continued, picture processing operation of the picture processing system will now be described more to detail. At a stage S1, the original picture of a nature color is inputted as input picture data into the input picture data memory 15 by the input unit 14.

Figure 3:
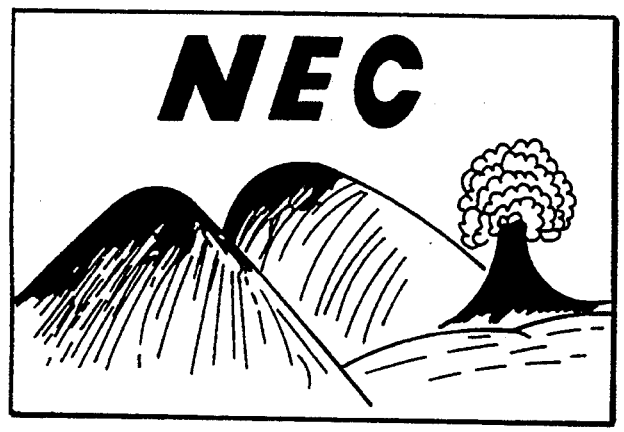
FIG. 3 exemplifies a natural picture (an original picture) inputted into the picture processing system of the facsimile device illustrated in FIG. 1.

Turning to FIG. 3, the original picture is exemplified which is a natural picture representing a natural image comprising a mountain image, a tree image, and so on. Although the natural image is shown by a monochrome, it will be assumed that the natural image has a natural color.

Turning back to FIGS. 1 and 2, the input picture data is memorized in the input picture data memory 15 as the input picture data signal 13 at a stage S2. At a stage S3, the input picture data signal 13 is compressed into the compressed picture data by the compressing unit 17. It will be assumed that such compression is carried out by using a DCT (Discrte Cosine Transform) method of the JPEG compression. The DCT method is known in the art. Upon compression of the input picture data signal 13, quantization of DCT coefficients is carried out. This results in reduction or cancelling of high frequency components of the input picture data signal 13. However, inasmuch as low frequency components of the input picture data signal 13 remain in the compressed picture data, the expanded picture data signal given by expanding the compressed picture data are looked by a human eye to approximately represent the original picture.

At a stage S4, the compressed picture data are memorized as the compressed picture data signal 16. At a stage S5, the compressed picture data signal 16 is expanded into the expanded picture data signal by the picture data expanding unit 19. Inasmuch as the expanded picture data signal is present with the high frequency components removed from the expanded picture data signal, edge or frame portions of the mountain image, the tree image, and other images of the original picture of FIG. 3 are looked to be blurred or spread. As a result, the difference which is detected between the expanded picture data signal and the input picture data signal 13 representative of the original picture by the difference detecting unit 12 at a stage S6, represents the edge portions of the mountain and the tree images with a natural color. The difference detecting unit 12 produces the difference picture data signal representative of the difference.

Figure 4:
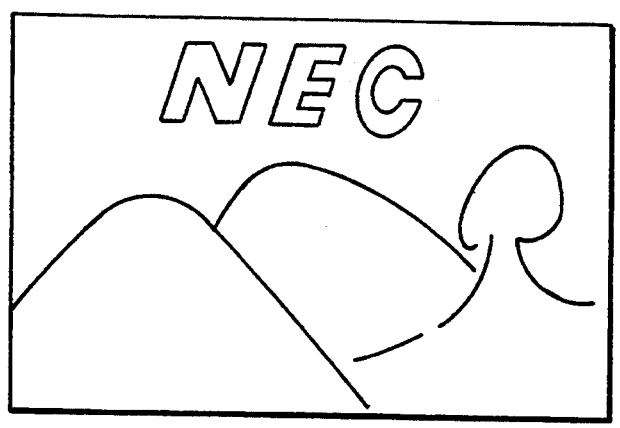
FIG. 4 exemplifies a difference produced by a difference detecting unit of the picture processing system of the facsimile device illustrated in FIG. 1.

Turning to FIG. 4, the difference is exemplified. The difference represents the edge or frame portions of the mountain and the tree images and other images with a natural color as mentioned above.

Turning back to FIGS. 1 and 2 again, the difference picture data signal representative of the difference of color data is converted into the binary picture data signal representative of binary picture data (that is, black and white data) at a stage S7. At a stage S8, the compressing unit 23 is supplied with the binary picture data as the characteristic line segment data and compresses the binary picture data into the compressed binary picture data by using the MH, the MR, and/or the MMR compression. At a stage S9, the compressed binary picture data are memorized in the compressed binary picture data memory 24 as the compressed binary picture data signal which is for use as the processed picture data signal.

Figure 5:
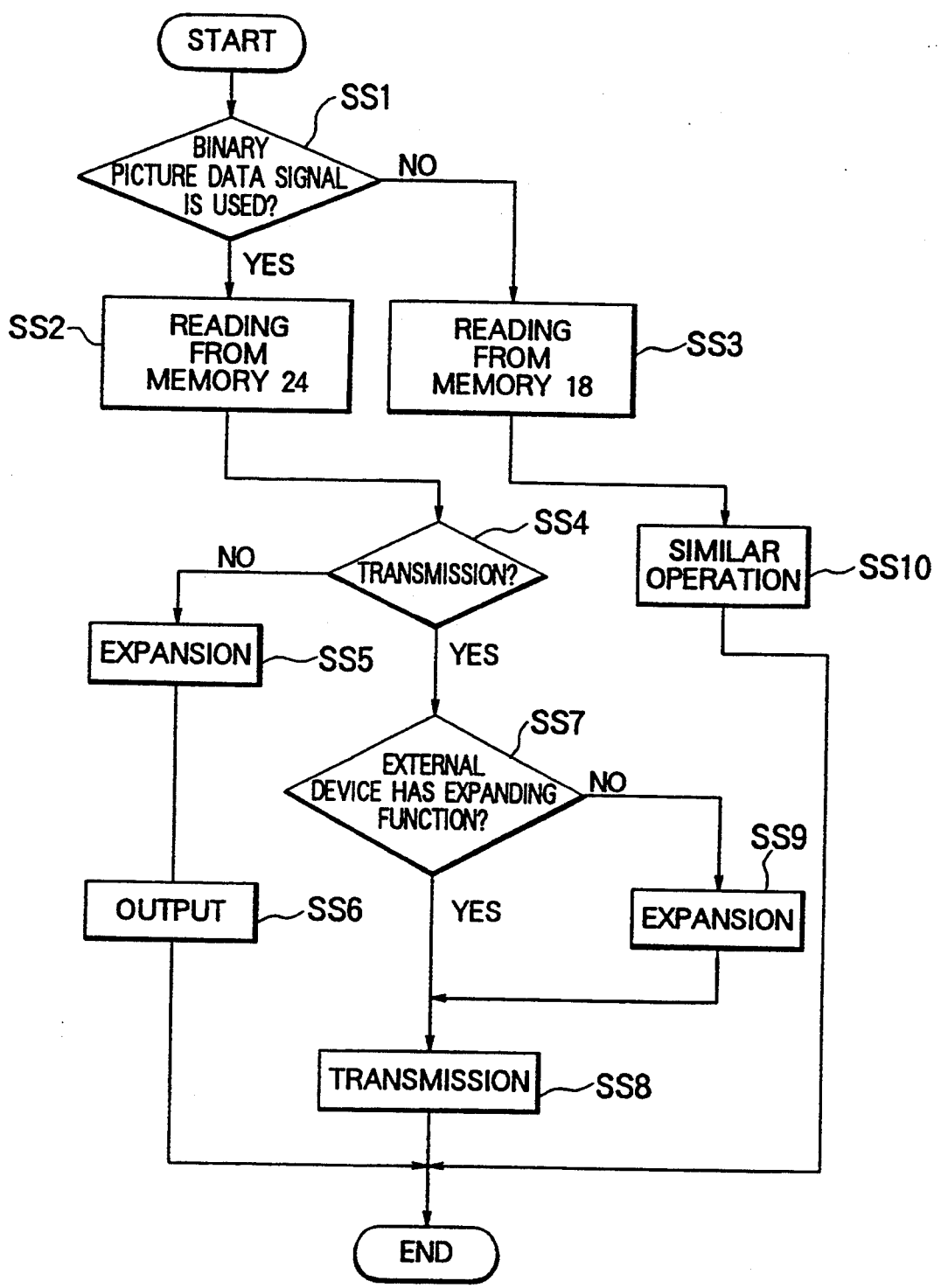
FIG. 5 is a flow chart for use in describing controlling operation of a control unit of the picture processing system of the facsimile device illustrated in FIG. 1.

Turning to FIG. 5 with reference to FIG. 1 continued, controlling operation of the control unit 27 will now be described. At a stage SS1, the control unit 27 judges whether the compressed binary picture data signal or the compressed picture data signal 16 is used with reference to a command produced by an operator of the facsimile device 100. When the compressed binary picture data signal is used, the control unit 27 reads the compressed binary picture data signal out of the compressed binary picture data memory 24 at a stage SS2. When the compressed picture data signal 16 is used, the control unit 27 reads the compressed picture data signal 16 out of the compressed picture data memory 18 at a stage SS3.

At a stage SS4 which follows the stage SS2, the control unit 27 judges whether transmission operation or output operation is carried out with reference to another command produced by the operator. When the transmission operation is not carried out (that is, when the output operation is carried out), the compression binary picture data signal is subjected to expansion in the binary picture data expanding unit 26 and is produced as the expanded binary picture data signal at a stage SS5. At a stage SS6 which succeeds the stage SS5, the control unit 27 makes the output unit 28 output the expanded binary picture data signal as the output picture image.

When the transmission operation is carried out, a stage SS7 follows the stage SS4. At the stage SS7, the control unit 27 judges with reference to still another operator command whether or not the external device 200 has an expanding function which is similar to the binary picture data expanding unit 26. When the external device 200 has the expanding function, the control unit 27 makes the transmitting unit 25 transmit the compressed binary picture data signal of the compressed binary picture data memory 24 to the external device 200 as the facsimile data signal at a stage SS8. When the external device 200 does not have the expanding function, the compressed binary picture data signal is subjected to expansion in the binary picture data expanding unit 26 and is produced as the expanded binary picture data signal at a stage SS9. In this case, the control unit 27 makes the transmitting unit 25 transmit the expanded binary picture data signal at the stage SS8.

Alternatively, when the control unit 27 makes the transmitting unit 25 transmit a selected one of the compressed binary picture data signal and the expanded binary picture data signal to the external device 200, the control unit 27 controls the output unit 28 to output, as the output picture image, the selected one of the compressed binary picture data signal and the expanded binary picture data signal.

At a stage SS10 which succeeds the stage SS3, the control unit 27 carries out, for the compressed picture data signal 16, similar operation which is similar to the stages SS4 to SS9. The similar operation of the stage SS10 will be described on the supposition that the similar operation is carried out at the stages SS4 to SS9.

At the stage SS4 which follows the stage SS3, the control unit 27 judges whether transmission operation or output operation is carried out with reference to a different command produced by the operator. When the transmission operation is not carried out (that is, when the output operation is carried out), the compressed picture data signal 16 is subjected to expansion in the picture data expanding unit 19 and is produced as the expanded picture data signal at the stage SS5. At the stage SS6 which succeeds the stages SS5, the control unit 27 makes the output unit 28 output the expanded picture data signal as the output picture image.

When the transmission operation is carried out, the control unit 27 judges with reference to another different command at the stage SS7 whether or not the external device 200 has another expanding function which is similar to the picture data expanding unit 19. When the external device 200 has the expanding function, the control unit 27 makes the transmitting unit 25 transmit the compressed picture data signal 16 of the compressed picture data memory 18 to the external device 200 as the facsimile data signal at the stage SS8. When the external device 200 does not have the expanding function, the binary picture data signal 16 is subjected to expansion in the picture data expanding unit 19 to be produced as the expanded picture data signal at the stage SS9. In this case, the control unit 27 makes the transmitting unit 25 transmit the expanded picture data signal at the stage SS8.

As an alternative, the control unit 27 controls the output unit 28 to output the expanded picture data signal as the output picture image when the control unit 27 makes the transmitting unit 25 transmit any one of the compressed picture data signal 16 and the expanded picture data signal to the external device 200.

By transmitting the facsimile data signal by the use of the picture processing system according to this invention, the external device 200 can reproduce the original picture from the facsimile data signal with a high quality.

What is claimed is:

1. A picture processing system for processing an input picture data signal representative of an original picture into a processed picture data signal, said system comprising:

first compressing means supplied with said input picture data signal for compressing said input picture data signal into a compressed picture data signal;

a picture data expanding unit connected to said first compressing means for expanded said compressed picture data signal into an expanded picture data signal;

a detecting unit supplied with said input picture data signal and connected to said picture data expanding unit for detecting a difference between said input picture data signal and said expanded picture data signal to produce a difference picture data signal representative of said difference;

a converting unit connected to said detecting unit for converting said difference picture data signal into a binary picture data signal; and second compressing means connected to said converting unit for compressing said binary picture data signal into a compressed binary picture data signal which is for use as said processed picture data signal.

2. A picture processing system as claimed in claim 1, further comprising: inputting means connected to said first compressing means and said detecting means for inputting said original picture as said input picture data signal into said first compressing means and said detecting unit.

3. A picture processing system as claimed in claim 1, further comprising: a transmitting unit connected to said second compressing means for transmitting said compressed binary picture data signal to an external device as a facsimile data signal.

4. A picture processing system as claimed in claim 1, further comprising:

a binary picture data expanding unit connected to said second compressing means for expanding said compressed binary picture data signal into an expanded binary picture data signal; and a transmitting unit connected to said binary picture expanding unit for transmitting said expanded binary picture data signal to an external device as a facsimile data signal.

5. A picture processing system as claimed in claim 1, further comprising:

a binary picture data expanding unit connected to said second compressing means for expanding said compressed binary picture data signal into an expanded binary picture data signal; and a transmitting unit connected to said second compressing means and said binary picture expanding unit for transmitting one of said compressed binary picture data signal and said expanded binary picture data signal to an external device as a facsimile data signal.

6. A picture processing system as claimed in claim 1, further comprising:

a binary picture data expanding unit connected to said second compressing means for expanding said compressed binary picture data signal into an expanded binary picture data signal; and an output unit connected to said binary picture data expanding unit for outputting said expanded binary picture data signal as an output picture image.

7. A picture processing system as claimed in claim 6, wherein said output unit is further connected to said picture data expanding unit to output one of said expanded binary picture data signal and said expanded picture data signal as said output picture image.

* * * * *